United States Patent [19]

Schmieder et al.

[11] 4,059,671

[45] Nov. 22, 1977

[54] METHOD FOR INCREASING THE LIFETIME OF AN EXTRACTION MEDIUM USED FOR REPROCESSING SPENT NUCLEAR FUEL AND/OR BREEDER MATERIALS

[75] Inventors: Helmut Schmieder, Karlsruhe; Ludwig Stieglitz, Graben-Neudorf, both of Germany

[73] Assignee: Gesellschaft fur Kernforschung m.b.H., Karlsruhe, Germany

[21] Appl. No.: 624,107

[22] Filed: Oct. 20, 1975

[30] Foreign Application Priority Data

Oct. 18, 1974   Germany ............................. 2449589

[51] Int. Cl.$^2$ ............................................ B01D 11/04
[52] U.S. Cl. ...................................... 423/10; 210/21; 252/364; 260/429 R
[58] Field of Search ..................... 423/10; 260/429.1; 252/364; 210/21

[56] References Cited

U.S. PATENT DOCUMENTS

| | | | |
|---|---|---|---|
| 3,574,532 | 4/1971 | Schulz et al. | 423/10 |
| 3,708,508 | 1/1973 | Schulz | 423/10 X |
| 3,949,049 | 4/1976 | Ochsenfeld et al. | 423/10 |

*Primary Examiner*—Richard E. Schafer
*Attorney, Agent, or Firm*—Spencer & Kaye

[57] ABSTRACT

A method is provided for increasing the lifetime of an extraction medium containing an organophosphorus acid ester and a hydrocarbon and being used for reprocessing spent nuclear fuel and/or breeder materials. Impurities resulting from chemical and/or radiolytic decomposition and interfering compounds of such impurities with radionuclides are removed from the extraction medium by bringing the extraction medium, after use, into intimate contact with an aqueous hydrazine hydrate solution having a concentration of between about 0.1 molar and about 1.0 molar at a temperature between about 20° C to about 75° C. The aqueous hydrazine hydrate solution is then separated from the extraction medium.

7 Claims, No Drawings

METHOD FOR INCREASING THE LIFETIME OF AN EXTRACTION MEDIUM USED FOR REPROCESSING SPENT NUCLEAR FUEL AND/OR BREEDER MATERIALS

BACKGROUND OF THE INVENTION

The present invention relates to a process for increasing the lifetime of an extraction medium containing an organophosphorus acid ester and a hydrocarbon, which extraction medium is used to reprocess spent nuclear fuel and/or breeder materials, and more particularly, to a process for removing from the extraction medium impurities produced by chemical and/or radiolytic decomposition and the undesirable compounds of these substances with radionuclides.

In reprocessing spent nuclear fuels and/or breeder materials, the burnt up fuel elements are treated for the recovery of uranium, in reactors where plutonium is also formed, for the recovery of plutonium, and in reactors where breeder material is also formed for the recovery of breeder material. As a rule, the recovery is carried out by dissolving the fuel elements, usually in nitric acid, to form an aqueous solution containing uranium, plutonium, fission products, and/or breeder materials. The uranium and/or plutonium are then extracted from the aqueous solution by bringing the aqueous solution into contact with an organic solvent. During this extraction, the fission products remain in the aqueous solution. The organic solvent used to effect the extraction is generally present in an extraction medium where it is in admixture with a diluent. After the extraction into the organic extraction medium, the plutonium can be stripped from the organic extract into an aqueous solution and then the uranium can be stripped from the organic extract into an aqueous solution. Upon removal of the plutonium and uranium from the organic extract, the organic extract can be recycled and reused in the process system.

The organic extraction mediums most commonly employed at present comprise a mixture of an organophosphorus acid ester which serves as the active solvent extractant and an aliphatic hydrocarbon (alkane) which serves as a diluent for the solvent. Typical hydrocarbon diluents are homologues in the range of $C_{10}H_{22}$ to $C_{13}H_{28}$, with kerosene fractions being particularly suitable. The organophosphorus acid ester solvents which are most commonly employed are trialkyl phosphates which preferably comprise about 3 to 8 carbon atoms among each of its alkyl radicals. The most used solvent extractant is tri-n-butyl phosphate, hereafter referred to as "TBP". A satisfactory composition range for the organic extraction medium is approximately 10% to 40% trialkyl phosphate, by volume, and the remainder diluent, although other ratios can be used.

During contact of the extraction medium with the aqueous, nitric acid solution which contains heavily radioactive fission products and nuclear fuel and/or breeder materials, radiolytic and chemical reactions occur which produce undesirable decomposition products in the extractant medium which unfavorably influence the function of the extraction process. Among other things, these decomposition products form strong complexes with plutonium, which complexes strongly favor the organic phase over an aqueous phase. As a result, these complexes cannot be removed from the organic phase into an aqueous stripping phase so that the plutonium remains in the organic phase and losses of valuable plutonium to the organic phase result. Typical decomposition products which are formed and which give rise to such complexes are dibutyl phosphate (DBP) and monobutyl phosphate (MBP). Further, the pronounced complexing properties of the decomposition products bring about an increased, disturbing extraction of fission products, such as zirconium-95, from the starting aqueous nitric acid phase into the organic phase loaded with the various uranium, plutonium, and like actinides. Moreover, an increase in fission product concentration of the organic phase not only reduces the extraction efficiency for the actinides and the separation efficiencies both of the actinides from the fission products and the actinides from each other and the degree of purity of the individual actinides, but also enhances the radiolytic processes in the organic phase and, in addition, aggravates the phase separation by generating turbidities and colloids in the interface between the organic and aqueous phases. Thus, the increased extraction of fission products into the organic extractant medium causes decontamination factors which are less than adequate and a poor separation of the organic phase from the aqueous phase.

Finally, the decomposition products which accumulate in the extraction medium with increasing use of the extraction medium limit the usefulness of an extraction medium charge or its lifetime, respectively. Then, the spent extraction medium charge must be replaced by a fresh one. To overcome these problems, the extraction medium charges have been purified after use to increase their lifetime and considerably reduce operating costs.

For these reasons, it is necessary to provide a method which removes these decomposition products before the extraction medium is reused. In the past, the process which generally has been used in reprocessing plants for purifying the organic extraction medium includes washing the extraction medium in an aqueous solution of sodium carbonate or sodium hydroxide, or a mixture thereof. Thus, in one known reprocessing plant, for example, the organic extraction mediums are washed with 0.1 M $Na_2CO_3$ and then with 0.1 M NaOH, in a 4-stage mixer-separator, at 60° C. In a number of other plants, the processes differ only in the differences in concentration of the solutions, such as, for example, the use of 0.1 to 0.5 M $Na_2CO_3$ and 0.1 to 0.25 M NaOH, or in the use of pulsed or packed columns instead of a mixer-separator. The chemical principles of the various prior art processes, however, are substantially the same and have a number of significant drawbacks.

In practice, each individual extraction cycle in a process, such as the Purex process, in which tri-butyl phosphate is used as the solvent, must be followed by washing of the extraction medium (solvent wash). The use of aqueous sodium carbonate and sodium hydroxide wash solutions, however, creates a significant amount of salt-containing, alkali, aqueous waste solutions which must be treated as medium-active waste, must be solidified and finally put into permanent storage. At a large plant, voluminous quantities of solidified waste are formed, which may contain α-radiators, and lead to considerable problems and high operating costs.

When using an alkali aqueous wash solution, residual quantities of plutonium (IV) are extracted from the organic extraction medium into the alkali aqueous phase and form polymeric hydrolysis products in the aqueous waste wash solution which cannot be redissolved under the subsequent process conditions. Finally, deposits form. Particularly in plants having a high throughput, this produces the danger of criticality.

SUMMARY OF THE INVENTION

It is a primary object of the present invention to provide a process which avoids the drawbacks of the prior art processes for increasing the lifetime of an organic extraction medium used to reprocess spent nuclear fuel and/or breeder materials, and particularly, to avoid the drawbacks of the prior art extraction medium wash.

Another object of the present invention is to provide a process which substantially removes impurities and interfering compounds from the extraction medium while simultaneously assuring that the contents of solids in the spent wash solutions can be reduced before solidification by simple and inexpensive means so that a significant reduction in volume of the solidified wastes is realized when compared with those of the prior art wash solutions.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for increasing the lifetime of an extraction medium containing an organophosphorus acid ester and a hydrocarbon, which extraction medium is being used for reprocessing spent nuclear fuel and/or breeder materials, by removing from the extraction medium impurities resulting from chemical and/or radiolytic decomposition and interfering compounds of such impurities with radionuclides, which comprises bringing the extraction medium, after use, into intimate contact with an aqueous hydrazine hydrate solution having a concentration of between about 0.1 molar and about 1.0 molar at a temperature between about 20° C and about 75° C, and then separating the aqueous hydrazine hydrate solution from the extraction medium.

It is to be understood that both the foregoing general description and the following detailed description are exemplary, but are not restrictive of the invention.

DETAILED DESCRIPTION OF THE INVENTION

The extraction medium which is purified in the process of the present invention comprises a mixture of an organophosphorus acid ester which acts as a solvent extractant and a hydrocarbon diluent. The organophosphorus acid ester solvents which can be used generally are alkyl phosphates of the formula

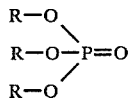

where R is an alkyl radical. The total number of carbon atoms preferably is at least 12 to provide adequate water immiscibility. Trialkyl phosphates containing from 3 to 8 carbon atoms among each of its alkyl radicals can be used, and tri-butyl phosphate is the most preferred solvent. Examples of other suitable alkyl phosphates are trioctyl phosphate, trihexyl phosphate. Of course, mixtures of these alkyl phosphates can be used as the solvent.

To produce an organic extractant phase of satisfactory viscosity, density and surface tension, the organic solvent is diluted with an appropriate inert, aqueous-immiscible liquid, which is a hydrocarbon. Petroleum hydrocarbon fractions, especially the saturated hydrocarbons, (paraffins and naphthenes) are suitable diluents. Particularly suitable for the diluent are $C_{10}H_{22}$ to $C_{13}H_{28}$ hydrocarbons and kerosene fractions. A mixture of alkyl phosphate and diluent is preferably used as the organic extraction medium and contains from 10% to 40% alkyl phosphate, by volume, with the remainder diluent. Higher or lower amounts of the alkyl phosphate can also be used.

The organic extraction medium is used to extract actinide elements, such as uranium, plutonium, and breeder materials from an aqueous nitric acid solution containing these elements and fission products, such as the radioactive isotopes of Zr, Nb, Ru, Rh, Y, Sr, Te, I, Cs, Ba, La, Ce and Pr. The term "fission" is used herein in its generally accepted meaning as referring to the splitting of an actinide element, notably uranium and plutonium, into a plurality of parts upon the capture of a neutron of appropriate energy, and the term "fission products" refers to the immediate product nuclei from fission as well as to their radioactive decay products. (See Glasstone, PRINCIPLES OF NUCLEAR REACTOR ENGINEERING, especially pages 105-128). The closely similar statistical fission product yields of U-233, U-235 and Pu-239 are shown in Stevenson, INTRODUCTION TO NUCLEAR ENGINEERING. During the extraction from the aqueous nitric acid solution into the organic extraction medium, the major part of the fission products remain in the aqueous nitric acid solution, but some fission products inevitably enter into the organic phase. The aqueous nitric acid phase is then separated from the loaded organic extraction medium containing the actinide elements. After separation, the actinide elements are then removed from the organic extraction medium by means well known in the art. For example, first the plutonium can be extracted into an aqueous stripping phase and then the uranium can be extracted into an aqueous stripping phase, or both the plutonium and uranium can be simultaneously extracted into an aqueous stripping phase. In any event, there results an organic extraction medium from which actinide elements have been removed and it is this extraction medium which is treated in accordance with the process of the present invention.

The used organic extraction medium contains impurities, such as, for example, dibutyl phosphate and monobutyl phosphate which are formed as a result of acid hydrolysis and radiolysis reactions that occur during the extraction of the aqueous nitric acid solution. These impurities form strong complex compounds with a number of the radionuclides, that is, with the fission products, particularly with Zr, and with Pu (IV) which is present in the organic extraction medium. As a result, when the impurities are present, a large increase in the zirconium distribution in the organic phase will occur when the organic extraction medium is reused. Further, the Pu (IV) complex strongly favors the organic extractant phase and causes losses of Pu (IV) to the organic phase during aqueous stripping.

In accordance with the present invention, the used organic extraction medium, from which actinide elements have been removed, is intimately contacted with an aqueous hydrazine hydrate solution at a temperature in the range of between about 20° C to about 75° C, preferably 25° C to 40° C. The concentration of hydrazine hydrate in the aqueous solution is about 0.1 molar to about 1.0 molar, and preferably about 0.2 to 0.5 molar. The aqueous hydrazine hydrate solution preferably is effected continuously in countercurrent flow. The flow ratio in a continuous counter-current process is variable normally in the range of organic to aqueous as 100 to 10. But other flow ratios are also possible, they depend on the type of extraction apparatus and on the amount of acid in the organic phase.

Contact of the aqueous hydrazine hydrate solution with the organic extraction medium effects removal of the impurities and complex compounds of these impurities with radionuclides from the organic extraction medium into the aqueous hydrazine hydrate solution. As a result, the organic extraction medium is purified, and the purified extraction medium is then separated from the aqueous hydrazine solution and can be reused in the reprocessing system to again extract actinide elements from an aqueous nitric acid solution containing dissolved spent fuel elements.

The aqueous hydrazine hydrate solution after separation from the organic extraction medium is a spent aqueous waste solution and contains hydrazine, nitrate ions, acid hydrolysis products and/or radiolysis products, for example, dibutyl phosphate and monobutyl phosphate, as well as fission products, and can be treated in accordance with conventional procedure. For example, the aqueous waste solution can be treated with formic acid as disclosed in U.S. Pat. No. 3,673,086 to remove nitrate ions and then further processed to a solidified waste. Preferably, however, the spent aqueous hydrazine solution is first subjected to an electrolysis voltage in accordance with the method disclosed in copending U.S. Pat. application Ser. No. 624,108, entitled, "METHOD FOR PREPARING AQUEOUS, RADIOACTIVE WASTE SOLUTIONS FROM NUCLEAR PLANTS FOR SOLIDIFICATION", in the name of Schmieder and Kroebel, filed on the same day as the present application, assigned to the same assignee as the present application, and hereby incorporated by reference. In this way, hydrazine is converted at the anode, and the nitrate ions at the cathode, to gaseous oxidation or reduction products, respectively, such as, for example, $N_2$ and $O_2$.

The process of the present invention makes it possible for the salt content of the aqueous waste solutions from the organic extraction medium wash, which waste solutions due to their content of fission product nuclides must be considered as mediumactive waste solutions, to be reduced by more than a factor of 100 so that the final storage volume required for the solidified waste can be reduced drastically.

The process of the invention may be followed by treatment of the extraction medium with four-valent lead compounds at temperatures in the range between room temperature and about 100° C. The treatment of process solutions by lead (IV) compounds has the purpose of removing complexing agents, which cannot be removed by a simple basic washing procedure. Suitable are lead (IV) compounds such as lead tetraacetate, preferably however solid lead dioxide. The lead dioxide for example is used as a solid, either as pure granulate, or as a mixture with solid silicagel, preferably as a 10 wt% $PbO_2$—90 wt% $SiO_2$ mixture. This treatment effects an additional decontamination.

The effectiveness of the washing process of the present invention with respect to removal of acid hydrolysis or radiolysis products, particularly dibutyl phosphate (DBP) compared to the prior art wash with $Na_2CO_3$ and/or NaOH solutions is at least the same. In the present invention, the DBP concentration remaining in the organic phase lies below the present analytical limit of proof, i.e., it is less than 10 ppm.

The washing efficiency of the present invention with respect to fission products, as shown by a comparison of decontamination factors (DF) of the known processes with that of the present invention, is at least as good as that of the $Na_2CO_3$ wash. For example, in a single washing stage at room temperature with hydrazine hydrate, the present invention realizes a DF of 2.5 (total DF of Zr, Ru) whereas a single wash with $Na_2CO_3$ at room temperature realizes a comparable DF value of 2. With a total of three washing stages, the corresponding DF values are 14 for $Na_2CO_3$ solution, and 15 for the hydrazine hydrate solution used in the present invention. As increase in temperature in a single wash to 75° C produced a DF value of 11 for hydrazine solutions and 8.5 for $Na_2CO_3$ solutions.

An important advantage of the process of the present invention is that the deposits of polymeric plutonium (IV) compounds formed with the use of $Na_2CO_3$ or NaOH solutions, respectively, which deposits are difficult to impossible to dissolve and which will also not dissolve under the subsequent process conditions, are avoided when hydrazine hydrate solutions are used due to the reducing effect of the hydrazine wash solution which brings about reduction of Pu (IV) to Pu (III) so that there is no Pu (IV) which can polymerize.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the removal of dibutyl phosphate from an organic extraction agent.

An organic extraction agent comprising 30 volume percent tributyl phosphate (TBP) and 70 volume percent alkanes (mixture of $C_{10}$ to $C_{13}$ hydrocarbons) is mixed with 270 mg/l of dibutyl phosphate containing traces of fission products, namely, zirconium and niobium in a total amount of 1.2 to 1.8 m Ci/l and ruthenium and rhodium in a total amount of 7 to 8 m Ci/l. 5 ml of the resulting organic solution are brought into intimate contact with 5 ml of an aqueous 0.1 M hydrazine hydrate solution at 25° C and the two solutions are stirred together for 5 minutes. The organic phase is then separated from the aqueous phase. The residual concentration of DBP in the separated organic phase is less than 10 mg/l and thus is below the analytical limit of proof.

EXAMPLE 2

This example illustrates the removal of fission products at room temperature (25° C) from an organic extraction agent.

5 ml of an organic extraction solution containing 20 volume percent TBP and 80 volume percent alkanes contaminated with ruthenium, rhodium and zirconium, niobium to a degree of $4.34 \cdot 10^6$ pulses per minute and ml are treated with 5 ml of an aqueous 0.2 M hydrazin hydrate solution in three separate stages. In each stage, 5 ml of fresh hydrazine hydrate solution are stirred with the organic extraction solution for 5 minutes and then the organic phase is separated from the aqueous phase. The residual activity of the separated organic phase after the first washing stage is $1.7 \cdot 10^6$ pulses per minute and ml, with a DF of 2.5. After the second washing stage, the residual activity of the separated organic phase is $9 \cdot 10^5$ pulses per minute and ml, with a DF of 4.8. After the third washing stage, the residual activity is $2.9 \cdot 10^5$ pulses per minute and ml, with a DF of 15.

EXAMPLE 3

This example illustrates the removal of fission products from an organic extraction agent at partially increased temperature.

The same solutions and quantities were used as in Example 2. The residual activities after the first washing stage were:

a. at 25° C : $2 \cdot 10^6$ pulses per minute and ml, with a DF of 2.2;

b. at 50° C : $6.5 \cdot 10^5$ pulses per minute and ml, with a DF of 6.7; and c. at 75° C : $3.95 \cdot 10^5$ pulses per minute and ml, with a DF of 11.

It will be understood that the above description of the present invention is susceptible to various modifications, changes and adaptations, and the same are intended to be comprehended within the meaning and range of equivalents of the appended claims.

What is claimed is:

1. In a method for increasing the lifetime of an extraction medium containing an organophosphorus acid ester and a hydrocarbon, and being used for reprocessing spent nuclear fuel and/or breeder materials, by removing from the extraction medium impurities resulting from chemical and/or radiolytic decomposition and complex compounds of such impurities with radionuclides by washing the extraction medium with an aqueous wash solution, the improvement comprising bringing the extraction medium, after use, into intimate contact with an aqueous hydrazine hydrate wash solution having a concentration of between about 0.1 molar and 1.0 molar, at a temperature between about 20° C to about 75° C, and then separating the aqueous hydrazine hydrate wash solution from the extraction medium.

2. The method as defined in claim 1 wherein the extraction medium is contacted with the aqueous hydrazine hydrate solution continuously and in counterflow.

3. The method as defined in claim 1 wherein the purified and separated extraction medium is returned to be reused in circulation.

4. The method as defined in claim 1 wherein the organophosphorus acid ester comprises a trialkyl phosphate.

5. The method as defined in claim 1 wherein the organophosphorus acid ester is tributyl phosphate.

6. The method as defined in claim 5 wherein the impurities comprise dibutyl phosphate.

7. The method as defined in claim 1 including treating the extraction medium with lead (IV) compounds after separating the aqueous hydrazine hydrate solution from the extraction medium.

* * * * *